United States Patent
You et al.

(10) Patent No.: US 12,354,358 B2
(45) Date of Patent: Jul. 8, 2025

(54) SYSTEM AND SIGNALLING OF VIDEO SPLITTER AND MERGER FOR PARALLEL NETWORK BASED MEDIA PROCESSING

(71) Applicant: Nokia Technologies Oy, Espoo (FI)

(72) Inventors: Yu You, Kangasala (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 428 days.

(21) Appl. No.: 17/341,551

(22) Filed: Jun. 8, 2021

(65) Prior Publication Data
US 2021/0390318 A1  Dec. 16, 2021

Related U.S. Application Data

(60) Provisional application No. 63/037,087, filed on Jun. 10, 2020.

(51) Int. Cl.
  *G06V 20/40*  (2022.01)
  *G06T 7/11*  (2017.01)
  *H04L 65/60*  (2022.01)

(52) U.S. Cl.
  CPC ............... *G06V 20/49* (2022.01); *G06T 7/11* (2017.01); *H04L 65/60* (2013.01)

(58) Field of Classification Search
  CPC ............ G06V 20/49; G06T 7/11; H04L 65/60
  See application file for complete search history.

(56) References Cited

U.S. PATENT DOCUMENTS

| | | | | |
|---|---|---|---|---|
| 8,620,077 B1 * | 12/2013 | Grundmann | ............ | G06V 20/49 382/164 |
| 8,965,124 B1 | 2/2015 | Kwatra | ........................ | 382/173 |
| 9,432,704 B2 * | 8/2016 | Mutton | ................ | H04N 19/177 |
| 10,951,540 B1 * | 3/2021 | De Kadt | ................. | H04L 47/70 |
| 12,206,874 B1 * | 1/2025 | Waggoner | ............ | H04N 19/182 |
| 2008/0037880 A1 * | 2/2008 | Lai | .......................... | H04N 19/64 375/240 |
| 2008/0075164 A1 * | 3/2008 | Matsumura | .......... | H04N 19/149 375/240.12 |
| 2012/0246740 A1 * | 9/2012 | Brooker | ................ | G06F 21/629 726/28 |

(Continued)

FOREIGN PATENT DOCUMENTS

| | | | | |
|---|---|---|---|---|
| CN | 101827242 | A * | 9/2010 | |
| EP | 3296870 | A1 * | 3/2018 | .......... G06F 11/2025 |
| WO | WO-2014077748 | A1 * | 5/2014 | ........... H04L 63/306 |

OTHER PUBLICATIONS

You, Yu et al., "OMAF4CLOUD: Standards-Enabled 360° Video Creation as a Service", IBC365, 2019, 8 pages.

(Continued)

*Primary Examiner* — James R Sheleheda
(74) *Attorney, Agent, or Firm* — McCarter & English LLP

(57) ABSTRACT

In accordance with example embodiments of the invention there is at least one method and apparatus to perform assigning, by a network device, a step descriptor to at least one segment split of a workflow comprising at least one data input instance from at least one network node; and sending at least one sub-flow of the workflow based on the at least one segment split towards at least one queued task for communication processing, wherein the communication processing is based at least on the step descriptor assigned to the at least one segment split.

32 Claims, 13 Drawing Sheets

(56) References Cited

U.S. PATENT DOCUMENTS

| | | | | |
|---|---|---|---|---|
| 2012/0300854 A1* | 11/2012 | Chen | ............... | H04L 65/103 |
| | | | | 375/E7.027 |
| 2013/0104177 A1* | 4/2013 | Kwan | ............... | H04N 21/8456 |
| | | | | 725/93 |
| 2013/0117418 A1* | 5/2013 | Mutton | ............... | H04L 65/75 |
| | | | | 709/219 |
| 2014/0153909 A1* | 6/2014 | MacInnis | ............... | H04N 21/242 |
| | | | | 386/353 |
| 2014/0334557 A1* | 11/2014 | Schierl | ............... | H04N 19/436 |
| | | | | 375/240.27 |
| 2015/0023413 A1* | 1/2015 | Jung | ............... | H04N 19/146 |
| | | | | 375/240.03 |
| 2015/0139334 A1* | 5/2015 | Eregala | ............... | H04N 19/96 |
| | | | | 375/240.24 |
| 2015/0244757 A1* | 8/2015 | Zhuang | ............... | G06F 9/5066 |
| | | | | 709/219 |
| 2015/0271531 A1* | 9/2015 | Wen | ............... | H04N 19/176 |
| | | | | 375/240.16 |
| 2015/0341392 A1* | 11/2015 | Marfia | ............... | H04L 63/306 |
| | | | | 370/259 |
| 2016/0034306 A1* | 2/2016 | Galdy | ............... | G06F 9/4881 |
| | | | | 718/104 |
| 2016/0044329 A1* | 2/2016 | Wang | ............... | H04N 19/65 |
| | | | | 382/238 |
| 2016/0191922 A1* | 6/2016 | Chao | ............... | H04N 19/172 |
| | | | | 375/240.02 |
| 2016/0219286 A1* | 7/2016 | Gadepalli | ............ | H04N 19/184 |
| 2016/0248834 A1* | 8/2016 | Richards | ............... | H04N 19/46 |
| 2017/0078376 A1* | 3/2017 | Coward | ............... | H04N 19/395 |
| 2018/0338156 A1* | 11/2018 | Morigami | ............... | H04N 19/80 |
| 2019/0036836 A1* | 1/2019 | Le | ............... | H04L 65/40 |
| 2020/0029086 A1* | 1/2020 | Zou | ............... | H04N 19/436 |
| 2020/0177694 A1 | 6/2020 | Kolan et al. | | |
| 2020/0341806 A1* | 10/2020 | Sodagar | ............... | H04L 65/80 |
| 2021/0004273 A1* | 1/2021 | You | ............... | H04L 47/70 |
| 2021/0093958 A1* | 4/2021 | Yong | ............... | A63F 13/50 |
| 2021/0096903 A1* | 4/2021 | Sodagar | ............... | G06F 9/526 |
| 2021/0096904 A1* | 4/2021 | Sodagar | ............... | G06F 9/542 |
| 2021/0096924 A1* | 4/2021 | Sodagar | ............... | G06F 9/3885 |
| 2021/0096925 A1* | 4/2021 | Sodagar | ............... | G06F 9/542 |
| 2021/0099403 A1* | 4/2021 | Sodagar | ............... | G06F 9/544 |
| 2021/0105338 A1* | 4/2021 | Oyman | ............... | H04L 67/61 |
| 2021/0211721 A1* | 7/2021 | Park | ............... | H04N 19/174 |
| 2021/0218787 A1* | 7/2021 | Sodagar | ............... | H04L 67/51 |
| 2021/0314379 A1* | 10/2021 | Sodagar | ............... | H04L 65/762 |
| 2021/0390318 A1* | 12/2021 | You | ............... | G06V 20/49 |
| 2021/0400097 A1* | 12/2021 | Sodagar | ............... | H04L 65/60 |
| 2022/0167026 A1* | 5/2022 | You | ............... | H04L 67/60 |
| 2023/0108435 A1* | 4/2023 | Sodagar | ............... | H04L 65/765 |
| | | | | 709/219 |
| 2023/0224347 A1* | 7/2023 | Sodagar | ............... | H04L 65/70 |
| | | | | 709/217 |
| 2025/0005929 A1* | 1/2025 | Bonsor-Matthews | ............... | |
| | | | | G06V 10/25 |

OTHER PUBLICATIONS

"Potential improvements of ISO/IEC 23090-8 Network-based media processing", ISO/IEC JTC 1/SC 29/WG11, N19062, Mar. 17, 2020, 129 pgs.

"ISO/IEC 23090-8 CAMD 1 NB/MP Function Templates", ISO/IEC JTC 1/SC 29/WG 11, N19283, May 7, 2020, 84 pgs.

* cited by examiner

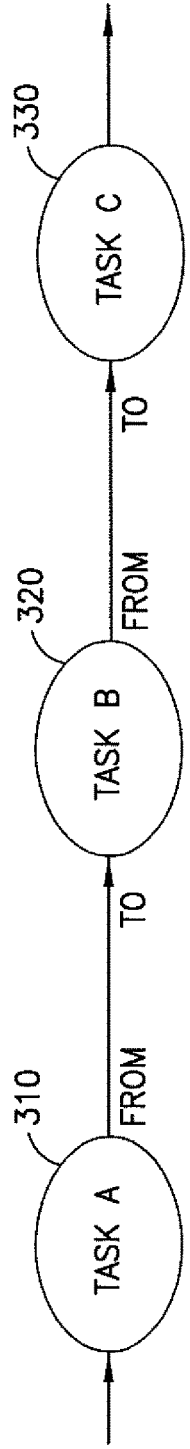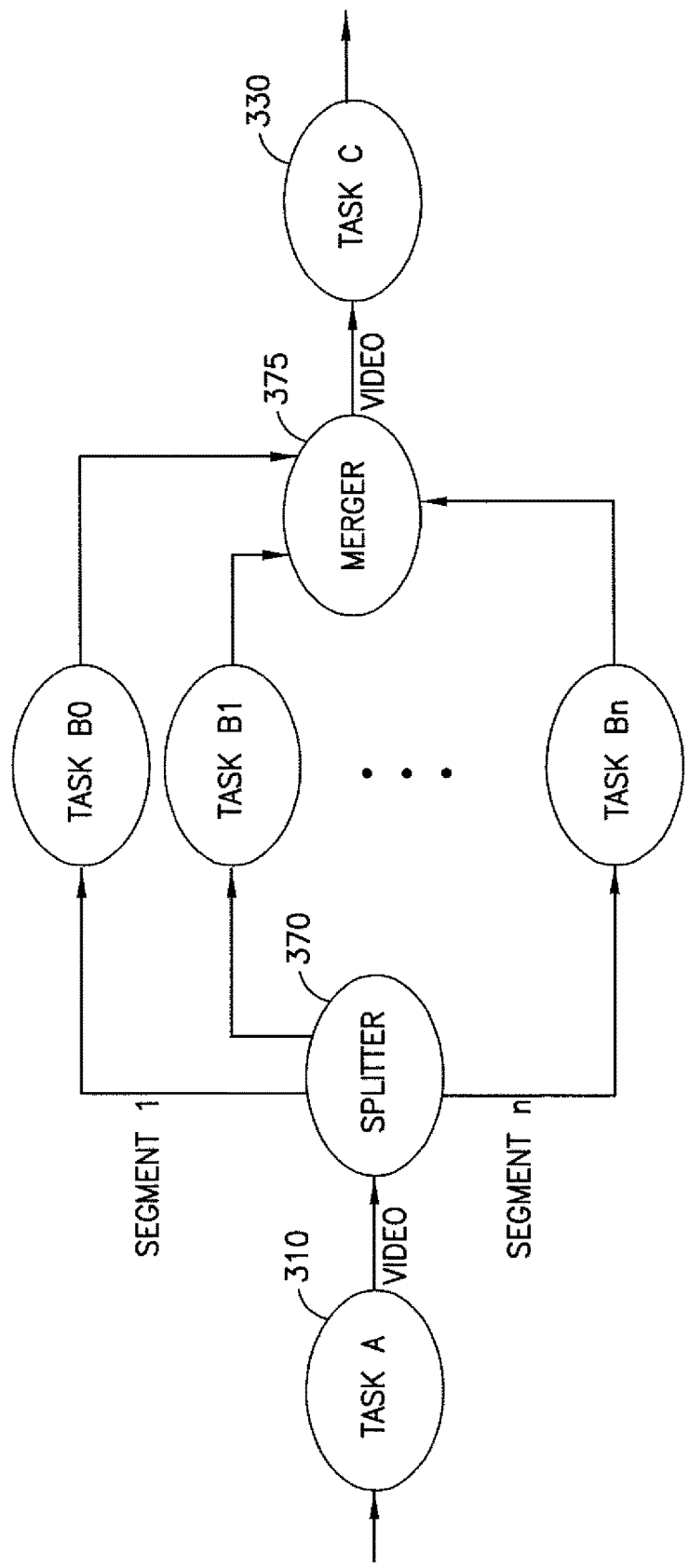

| | | | | |
|---|---|---|---|---|
| STEP-MODE | RUNNING MODE WITH THE FOLLOWING VALUES:<br>- 'STREAM': CONTINUOUS EXECUTION<br>- 'STATEFUL': MAINTAIN THE STATE OF TASKS AT END EACH STEP<br>- 'STATELESS': RUN IN STATELESS MODE WITHOUT THE NEED FOR MAINTAINING STATE<br>THE DEFAULT VALUE IS 'STREAM' | N/A | STRING | N/A |
| SEGMENT-ID | SEGMENT IDENTIFIER | N/A | NUMBER | UNSIGNED INTEGER |
| TEMPORAL | | | | |
| SEGMENT-DURATION | THE DURATION FOR WHICH THE OUTPUT(S) OF RESOURCE ARE INDEPENDENT TO ANY INPUTS OUTSIDE OF THE CORRESPONDING DURATION | MICROSECONDS | NUMBER | UNSIGNED INTEGER |
| OPERATION-UNITS | THE NUMBER OF SEGMENT-DURATION THE RESOURCE IS OPERATING IN A STATELESS FASHION | N/A | NUMBER | UNSIGNED INTEGER |
| SPATIAL | | | | |
| REGION | SEGMENT REGION OF THE INPUT VIDEO FRAME. COMPRISES A NUMBER OF COORDINATE POINTS IN THE INPUT VIDEO FRAME, IF APPLICABLE | PIXEL | ARRAY OF 2D COORDINATES | N/A |
| CONTENT-CROPPING | DETERMINES WHETHER THE GENERATED SEGMENT CONTAINS FULL FRAME OR PARTIALLY CROPPED PARTS ONLY | FLAG | BOOLEAN | N/A |
| REGION-ID | THE REGION IDENTIFIER USED FOR MERGER TASK TO RE-BUILD THE VIDEO FRAME, IF APPLICABLE | INTEGER | NUMBER | BETWEEN 0 AND LENS (REGIONS) −1 |
| VOLUMETRIC | | | | |
| VOLUME | SUB-VOLUME OF THE INPUT VOLUMETRIC SEGMENT. COMPRISES A NUMBER OF COORDINATE POINTS IN THE INPUT VOLUMETRIC SEGMENT, IF APPLICABLE | VOXEL | ARRAY OF 3D COORDINATES | N/A |
| CONTENT-CROPPING | DETERMINES WHETHER THE GENERATED SEGMENT CONTAINS FULL FRAME OR PARTIALLY CROPPED PARTS ONLY | FLAG | BOOLEAN | N/A |
| VOLUME-ID | THE REGION IDENTIFIER USED FOR MERGER TASK TO RE-BUILD THE VIDEO FRAME, IF APPLICABLE | INTEGER | NUMBER | BETWEEN 0 AND LENS (VOLUME) −1 |

FIG.7

| Name | Definition | Unit | Type | Valid range |
|---|---|---|---|---|
| number-of-dimension 610 | number of dimensions of a segment other than temporal. The default value is 0 | N/A | number | unsigned integer |
| high-dimension-segment-divisors 620 | array defining the divisors of the segment in the higher dimensions. Each element is an unsigned non-zero integer.<br>*The unit of divisor in each dimension depends on the unit of media on that dimension. For instance, the unit for spatial dimensions is the pixel, and the unit for color components is the color component index. The array size is equal to 'number-of-dimensions' | varies<br>*see the description | Array of number | unsigned integer |
| higher-dimensions-descriptions 630 | description of each other dimension. The array size is equal to 'number-of-dimensions'. Each element is a string.<br>The following values are defined in this document:<br>• 'width': width of the video frame<br>• 'height': height of the video frame<br>• 'RGB': color components R, G, and B, where R, G and B components are defined by index 0, 1, and 2 respectively.<br>• 'depth': image (not a depth map) and depth-map*, where image and depth-map are defined by index 0, 1, and 2 respectively.<br>• 'YUV': color components Y, U, V where Y, U and V components are defined by index 0, 1, and 2 respectively.<br>• 'V-PCC': V-PCC components patch, geometry, occupancy, and attribute, where patch, geometry, occupancy, and attribute are defined by index 0, 1, 2 and 3 respectively. | N/A | Array of string | N/A |
| higher-dimensions-segment-order 640 | The split/merge order for segments of the same time instance. The array shows the order of different dimensions. The value is an array element is the dimension index starting from zero. A dimension located in the array's element n+1 is nested in the dimension located in the array element n.<br>The array size is equal to 'number-of-dimensions'. | Unsigned integer | Array of number | N/A |
| higher-dimension-overlap 650 | The size of overlap at each dimension other than temporal. The array size is equal to 'number-of-dimensions'. Each element is an unsigned integer. When the given overlap value is greater than the size of the segment, the original data shall be used than the segment | Unsigned integer | Array of number | N/A |
| high-dimension-operation-units 660 | The number of segments of the resource in each dimension for operating in a stateless fashion. The array size is equal to 'number-of-dimensions'. Each element is an unsigned nonzero integer.<br>The default value is an array of 1s. | Unsigned integer | Array of number | N/A |

FIG.7.1

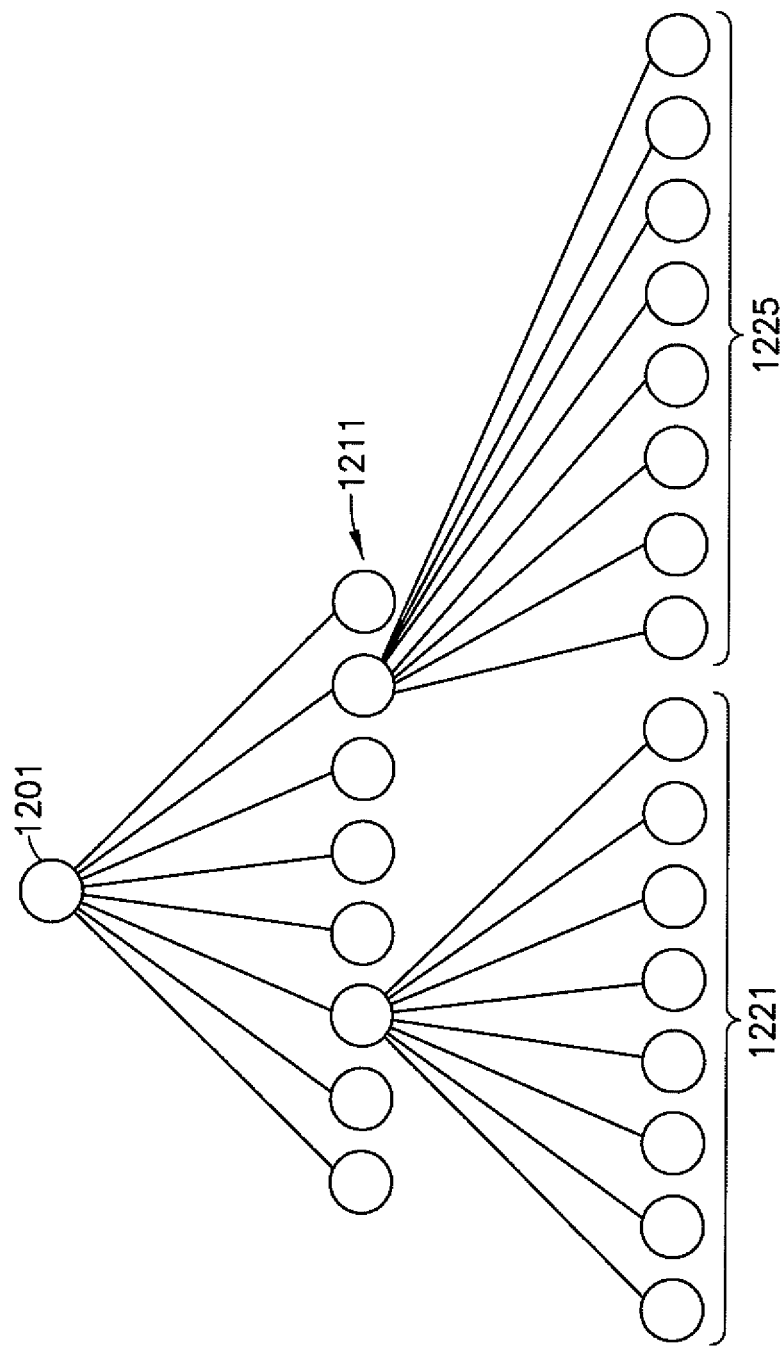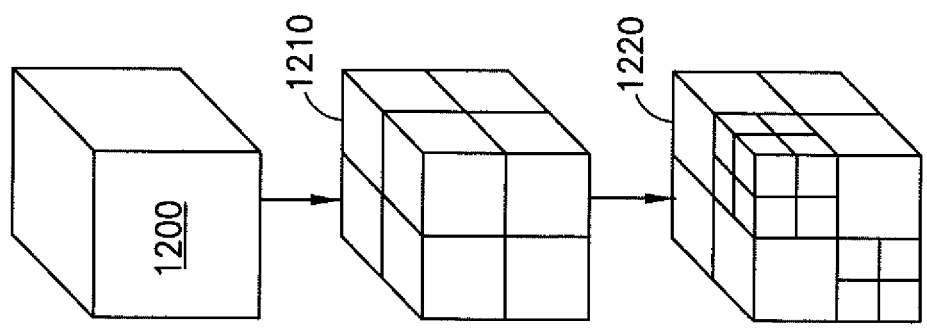
FIG. 12

SYSTEM AND SIGNALLING OF VIDEO SPLITTER AND MERGER FOR PARALLEL NETWORK BASED MEDIA PROCESSING

CROSS REFERENCE TO RELATED APPLICATIONS

The present application claims the benefit under 35 USC 119(e) of U.S. Provisional application No. 63/037,087, filed on Jun. 10, 2020, the disclosure of which is incorporated by reference herein in its Entirety.

TECHNICAL FIELD

The teachings in accordance with the exemplary embodiments of this invention relate generally to Network-based Media Processing for sub-workflows and, more specifically, relate to Network-based Media Processing using a step descriptor to at least identify sub-workflows for processing.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
API application programming interface
FDIS final draft international standard
FIFO first in first out
gNB/eNB base station
I/O input/output
MPE media processing entity
NBMP Network-based Media Processing
NR new radio
SD segment description
WDD workflow description document Network-based media processing is evolving to use for more complex tasks and services. A Network-based Media Processing (NBMP) standard is being developed to perform improved media processing on top of any cloud platform and/or communication network. The NBMP is used to define interfaces, media and metadata formats to facilitate media processing in the network or cloud. NBMP relies on a Workflow Manager, that receives a Workflow Description from the NBMP Source and information about the required processing and I/O formats to be configured for the media to be communicated.

Example embodiments of the invention work to improve at least these types of NBMP operations.

SUMMARY

This section contains examples of possible implementations and is not meant to be limiting.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: assign, by a network device, a step descriptor to at least one segment split of a workflow comprising at least one data input instance from at least one network node; and send at least one sub-flow of the workflow based on the at least one segment split towards at least one queued task for communication processing, wherein the communication processing is based at least on the step descriptor assigned to the at least one segment split.

A further example embodiment is an apparatus comprising the apparatus of the previous paragraph, wherein the assigning comprises the step descriptor is assigned to a payload of at least one segment split, wherein the processing comprises determining, in response to the sending, information comprising capacities associated with the at least one queued task for the communication, wherein the at least one memory including the computer program code is configured with the at least one processor to cause the apparatus at least to, based on the information, causing change of a state of the at least one queued task from an idle state to a running state for the communication processing, wherein the at least one segment split is based on at least one of temporal segmentation or spatial segmentation, wherein the temporal segmentation uses a one-dimensional segment and the spatial segmentation uses a two-dimensional segment, wherein the at least one segment split of the work flow is using correlation operations based on at least one of spatial segmentation or volumetric segmentation, wherein the volumetric segmentation uses a three dimensional segment, wherein the at least one segment split of the work flow is using correlation operations based on at least one of spatial or volumetric segmentation, or higher-degree segmentation, wherein the higher-degree segmentation uses segments determined by the number of dimensions and its divisor types, wherein for a case the at least one segment strip is based on temporal segmentation, the step descriptor comprises at least one of a segment identification, a monotonically increased time stamp, or a segment duration, wherein for a case the at least one segment strip is based on spatial segmentation, the step descriptor comprises at least one of segment identification, a timestamp, at least one of a regular or an irregular grid definition, or at least one of a regular or an irregular grid identifier, wherein the at least one segment identification comprises a monotonically increased timestamp for temporal segmentation, wherein the monotonically increased timestamp is identical for each segment associated with the at least one segment identification, wherein the segment identification together with at least one of a regular or an irregular grid identifier are unique to enable at least one of reassembly or merger of the at least one segment split of a workflow, wherein the communication processing comprises at least one of reassembly or merger of the at least one segment split of the workflow, wherein the at least one of reassembly or merger comprises at least one of adjacent or overlapping reassembly or merger functionalities, wherein the at least one of reassembly or merger takes into account grid tasks for at least one of a given temporal segment or a same timestamp value, wherein the communication processing comprises at least one of stateful or stateless execution of the at least one segment split of the workflow at the at least one queued task, wherein the at least one segment split is dynamic, comprising the at least one segment split is based on a content of media data of the workflow, wherein the at least one segment split is based on a video analysis task associated with the content of media data of the workflow, wherein the assigning the step descriptor comprises assigning step descriptors with a particular region definition for the communication processing, wherein for a case of two dimensional segmentation and the high dimension segment divisor is two and dimension description is the particular region width and height, wherein the particular region definition comprises a different or irregular region definition for storing the at least one segment split of a workflow for later communication processing, wherein assigning the step descriptor to at least one segment split of the workflow is based on an indication of at least one of a real-time run-time event, wherein assigning the step descriptor to at least one segment split of the workflow is based on an indication of the real-time run-time event comprising a quality of service indication, and/or wherein the indication of the real-time run-time event is received from at least one of a cloud provider or a client where a Network-based Media Processing sink is located.

In another example aspect of the invention, there is a method, comprising: assigning, by a network device, a step descriptor to at least one segment split of a workflow comprising at least one data input instance from at least one network node; and sending at least one sub-flow of the workflow based on the at least one segment split towards at least one queued task for communication processing, wherein the communication processing is based at least on the step descriptor assigned to the at least one segment split.

A further example embodiment is a method comprising the method of the previous paragraph, wherein the assigning comprises the step descriptor is assigned to a payload of at least one segment split, wherein the processing comprises determining, in response to the sending, information comprising capacities associated with the at least one queued task for the communication, wherein there is, based on the information, causing change of a state of the at least one queued task from an idle state to a running state for the communication processing, wherein the at least one segment split is based on at least one of temporal segmentation or spatial segmentation, wherein the temporal segmentation uses a one-dimensional segment and the spatial segmentation uses a two-dimensional segment, wherein the at least one segment split of the work flow is using correlation operations based on at least one of spatial segmentation or volumetric segmentation, wherein the volumetric segmentation uses a three dimensional segment, wherein the at least one segment split of the work flow is using correlation operations based on at least one of spatial or volumetric segmentation, or higher-degree segmentation, wherein the higher-degree segmentation uses segments determined by the number of dimensions and its divisor types, wherein for a case the at least one segment strip is based on temporal segmentation, the step descriptor comprises at least one of a segment identification, a monotonically increased time stamp, or a segment duration, wherein for a case the at least one segment strip is based on spatial segmentation, the step descriptor comprises at least one of segment identification, a timestamp, at least one of a regular or an irregular grid definition, or at least one of a regular or an irregular grid identifier, wherein the at least one segment identification comprises a monotonically increased timestamp for temporal segmentation, wherein the monotonically increased timestamp is identical for each segment associated with the at least one segment identification, wherein the segment identification together with at least one of a regular or an irregular grid identifier are unique to enable at least one of reassembly or merger of the at least one segment split of a workflow, wherein the communication processing comprises at least one of reassembly or merger of the at least one segment split of the workflow, wherein the at least one of reassembly or merger comprises at least one of adjacent or overlapping reassembly or merger functionalities, wherein the at least one of reassembly or merger takes into account grid tasks for at least one of a given temporal segment or a same timestamp value, wherein the communication processing comprises at least one of stateful or stateless execution of the at least one segment split of the workflow at the at least one queued task, wherein the at least one segment split is dynamic, comprising the at least one segment split is based on a content of media data of the workflow, wherein the at least one segment split is based on a video analysis task associated with the content of media data of the workflow, wherein the assigning the step descriptor comprises assigning step descriptors with a particular region definition for the communication processing, wherein for a case of two dimensional segmentation and the high dimension segment divisor is two and dimension description is the particular region width and height, wherein the particular region definition comprises a different or irregular region definition for storing the at least one segment split of a workflow for later communication processing, wherein assigning the step descriptor to at least one segment split of the workflow is based on an indication of at least one of a real-time run-time event, wherein assigning the step descriptor to at least one segment split of the workflow is based on an indication of the real-time run-time event comprising a quality of service indication, and/or wherein the indication of the real-time run-time event is received from at least one of a cloud provider or a client where a Network-based Media Processing sink is located.

A non-transitory computer-readable medium storing program code, the program code executed by at least one processor to perform at least the method as described in the paragraphs above.

In another example aspect of the invention, there is an apparatus comprising: means for assigning, by a network device, a step descriptor to at least one segment split of a workflow comprising at least one data input instance from at least one network node; and means for sending at least one sub-flow of the workflow based on the at least one segment split towards at least one queued task for communication processing, wherein the communication processing is based at least on the step descriptor assigned to the at least one segment split.

In accordance with the example embodiments as described in the paragraph above, at least the means for assigning and sending comprises a network interface, and computer program code stored on a computer-readable medium and executed by at least one processor.

A further example embodiment is an apparatus comprising the apparatus of the previous paragraph, wherein the assigning comprises the step descriptor is assigned to a payload of at least one segment split, wherein the processing comprises determining, in response to the sending, information comprising capacities associated with the at least one queued task for the communication, wherein there is means, based on the information, for causing change of a state of the at least one queued task from an idle state to a running state for the communication processing, wherein the at least one segment split is based on at least one of temporal segmentation or spatial segmentation, wherein the temporal segmentation uses a one-dimensional segment and the spatial segmentation uses a two-dimensional segment, wherein the at least one segment split of the work flow is using correlation operations based on at least one of spatial segmentation or volumetric segmentation, wherein the volumetric segmentation can use a higher-degree segmentation, wherein for a case the at least one segment strip is based on temporal segmentation, the step descriptor comprises at least one of a segment identification, a monotonically increased time stamp, or a segment duration, wherein for a case the at least one segment strip is based on spatial segmentation, the step descriptor comprises at least one of segment identification, a timestamp, at least one of a regular or an irregular grid definition, or at least one of a regular or an irregular grid identifier, wherein the at least one segment identification comprises a monotonically increased timestamp for temporal segmentation, wherein the monotonically increased timestamp is identical for each segment associated with the at least one segment identification, wherein the segment identification together with at least one of a regular or an irregular grid identifier are unique to enable at least one of reassembly or merger of the at least one segment split of a workflow, wherein the communication processing comprises at least one of reassembly or merger of the at least one segment split of the workflow, wherein the at least one of reassembly or merger comprises at least one of adjacent or overlapping reassembly or merger functionalities, wherein the at least one of reassembly or merger takes into account grid tasks for at least one of a given temporal segment or a same timestamp value, wherein the communication processing comprises means for at least one of stateful or stateless execution of the at least one segment split of the workflow at the at least one queued task, wherein the at least one segment split is dynamic, comprising the at least one segment split is based on a content of media data of the workflow, wherein the at least one segment split is based on a video analysis task associated with the content of media data of the workflow, wherein the assigning the step descriptor comprises assigning step descriptors with a particular region definition for the communication processing, wherein for a case of two dimensional segmentation and the high dimension segment divisor is two and dimension description is the particular region width and height, wherein the particular region definition comprises a different or irregular region definition for storing the at least one segment split of a workflow for later communication processing, wherein assigning the step descriptor to at least one segment split of the workflow is based on an indication of at least one of a real-time run-time event, wherein assigning the step descriptor to at least one segment split of the workflow is based on an indication of the real-time run-time event comprising a quality of service indication, and/or wherein the indication of the real-time run-time event is received from at least one of a cloud provider or a client where a Network-based Media Processing sink is located.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3A shows a static NBMP processing flow;

FIG. 3B shows a parallel NBMP processing flow in accordance with example embodiments of the invention;

FIG. 7 shows an improved NBMP segment descriptor table in accordance with example embodiments of the invention;

FIG. 7.1 shows a table associated with dimension operations in accordance with example embodiments of the invention;

FIG. 12 shows one volumetric segmentation by octree tree structure in accordance with example embodiments of the invention.

DETAILED DESCRIPTION

In this invention, there is proposed at least a novel method and apparatus for Network-based Media Processing using a step descriptor to at least identify sub-workflows for processing.

Figure 1:
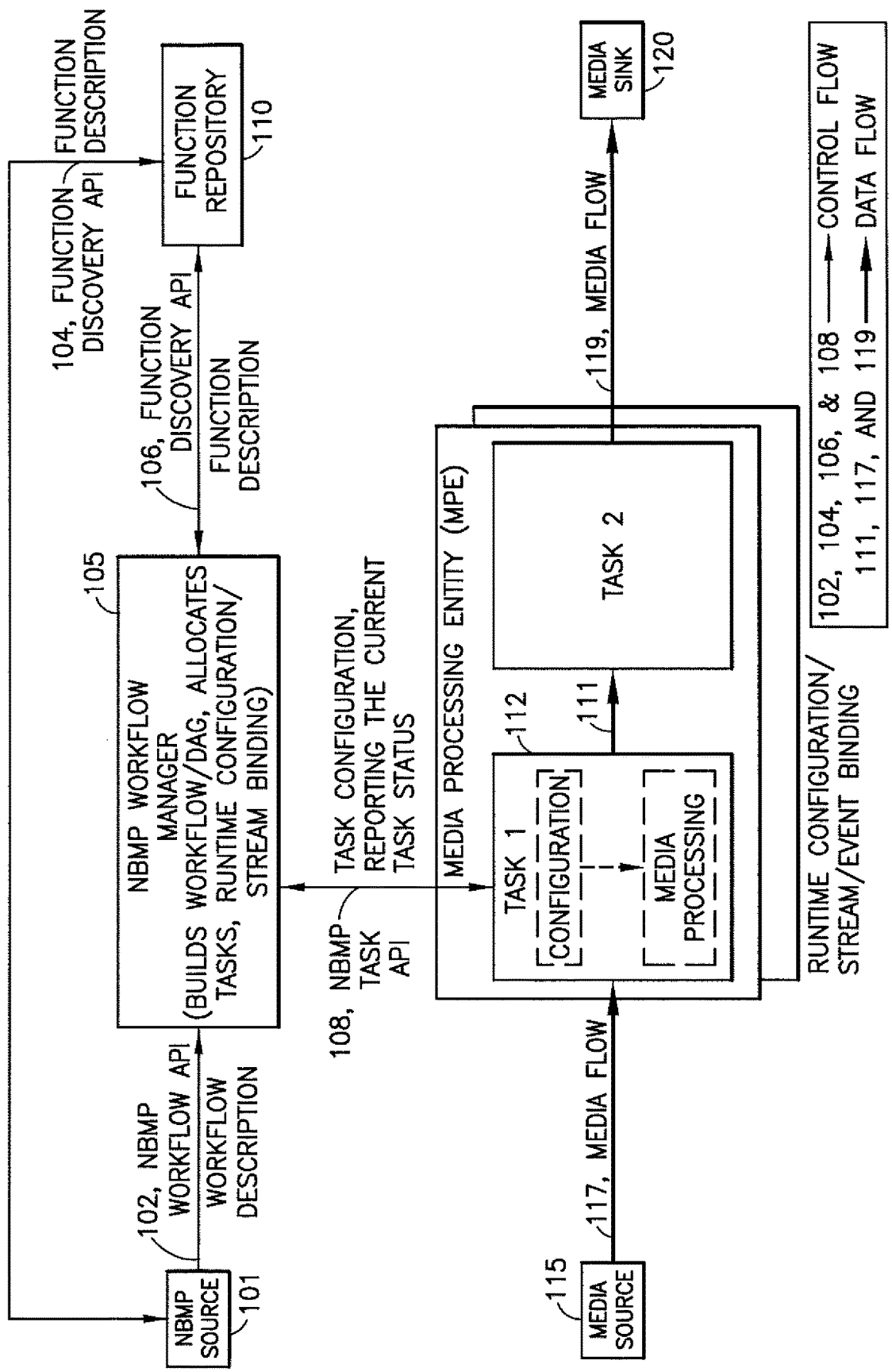
FIG. 1 shows an NBMP architecture for use in accordance with example embodiments of the invention.

FIG. 1 shows an NBMP architecture for use in accordance with example embodiments of the invention. As shown in FIG. 1 there is an NBMP source 101 providing an NBMP workflow API with a workflow description 102 to an NBMP workflow manager 105. As shown in FIG. 1 the NBMP workflow manager 105 is processing the NBMP workflow API with a function repository 110, and the NBMP source 101 is also exchanging a function discovery API and function description 104 with the Function repository 110. Then as shown in FIG. 1 the NBMP workflow manager 105 provides to the media processing entity (MPE) 112 the NBMP task API 108 including task configuration and reporting the current task status. As shown in FIG. 1 the media processing entity (MPE) 112 processes the media flow 117 from the media source 115 using a task 1 and task 2 configuration 111. Then as shown in FIG. 1 a media flow 119 is output towards the media sink 120. As shown in FIG. 1 the operations at 102, 104, 106, and 108 include control flow operations, and the operations 117, 111, and 119 include data flow operations.

Network-Based Media Processing (NBMP) enables offloading media processing tasks to the network-based environment like the cloud computing environments. NBMP processing relies on a Workflow Manager, that can be virtualized, to start and control media processing. The Workflow Manager receives a Workflow Description from the NBMP Source, which instructs the Workflow Manager about the desired processing and the input and output formats to be taken and produced, respectively.

The workflow manager (the Manager) creates a workflow based on the workflow description document (WDD) that it receives from the NBMP Source. The workflow manager selects and deploys the NBMP Functions into selected Media Processing Entities and then performs the configuration of the tasks. The WDD can include a number of logic descriptors The NBMP can define APIs and formats such as Function templates and Workflow Description Document (WDD) consisting of a number of logic descriptors. NBMP uses the so-called descriptors as the basic elements for its all resource documents such as the workflow documents, task documents, and function documents. Descriptors are a group of NBMP parameters which describe a set of related characteristics of Workflow, Function or Task. Some key descriptors are General, Input, Output, Processing, Requirements, Configuration etc.

In order to hide workflow internal details from the NBMP Source, all updates to the workflow are performed through Workflow Manager. The manager is the single point of access for the creation or change of any workflows. Workflows represent the processing flows defined in WDD provided by NBMP Source (aka. the client). A workflow can be defined as a chain of tasks, specified by the "connection-map" Object in the Processing Descriptor of the WDD.

The Workflow Manager may use pre-determined implementations of media processing functions and use them together to create the media processing workflow. NBMP defines a Function Discovery API that it uses with a Function Repository to discover and load the desired Functions.

A Function, once loaded, becomes a Task, which is then configured by the Workflow Manager through the Task API and can start processing incoming media. It is noted that a cloud and/or network service providers can define their own APIs to assign computing resources to their customers.

Figure 2:
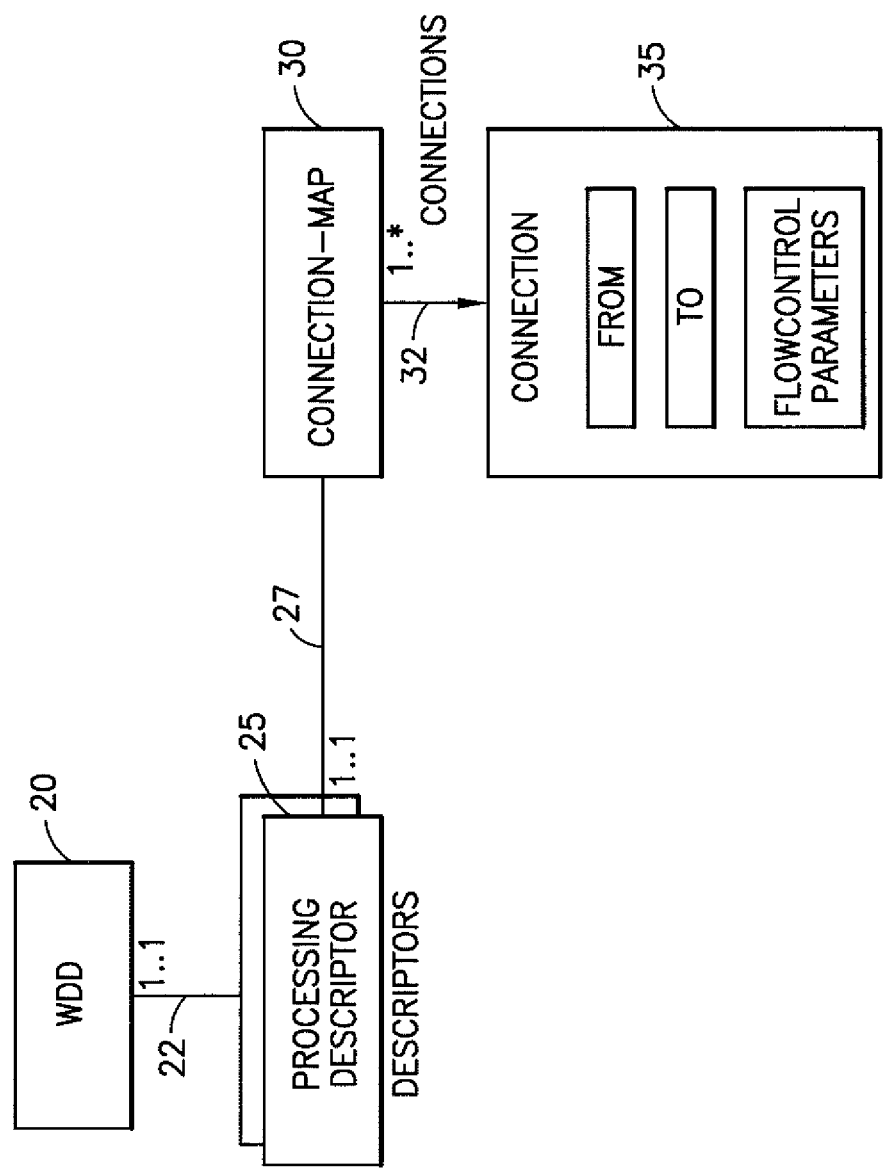
FIG. 2 shows an NBMP processing flow.

FIG. 2 shows an NBMP processing flow. As shown in FIG. 2 the WDD 20 communicates via link 22 with the processing descriptor 25 and via link 27 to a connection map 30 and then via link 32 using connections from and to resources and flow control parameters 35.

FIG. 3A shows a static NBMP processing flow. As shown in FIG. 3A there is a flow from a task A 310 to a task B 320 and via the task B 320 to a task C 330. This flow can be from queued tasks associated with Task A 310.

Such static processing flows are sufficient in most cases. However, it is common in processing flows where parallel flows are required for more efficient processing. That is, the workflow can split input data into parts or segments and boost the overall speed. In some situations, the splitting should work on more complex domain-specific situations or business logic, than simple ones such as temporal measurement like duration in time. Following example shows how NBMP can convert a single flow into parallel one (multiple Task B instances):

FIG. 3B shows a parallel NBMP processing flow in accordance with example embodiments of the invention. As shown in FIG. 3B there are parallel NBMP processing flows. As shown in FIG. 3B there is a flow from tasks such as queued tasks of a task A 310 to a splitter 370 for segmentation of the flow to task 130 thru task Bn. Then this segmented flow is merged at the merger 375 and sent to task C 330.

Current NBMP specification supports sub-workflows by temporal/timing information, such as segments, segment durations. As a generic media processing framework, NBMP splitter should be extended to support other ways of sub-workflow creations for frame-based processing, like video streams. In video encoders, it is common, for example, to subdivide video frames into smaller blocks (such as subpictures, tiles, cropped frames). In graphics rendering, split frame rendering (SFR) is also common. It is also common to divide a volumetric content such as a point cloud into sub-volumes for processing.

Another challenge is the need to limit NBMP source complexity by not requiring the NBMP source to create a complex WDD to handle all the details of splitting. Thus, the design goal of achieving greater workflow manager flexibility without concomitant increase in WDD creation complexity.

NBMP is a new standard under development and in accordance with example embodiments of the invention there is proposed new features to the Step Descriptor.

Figure 10:
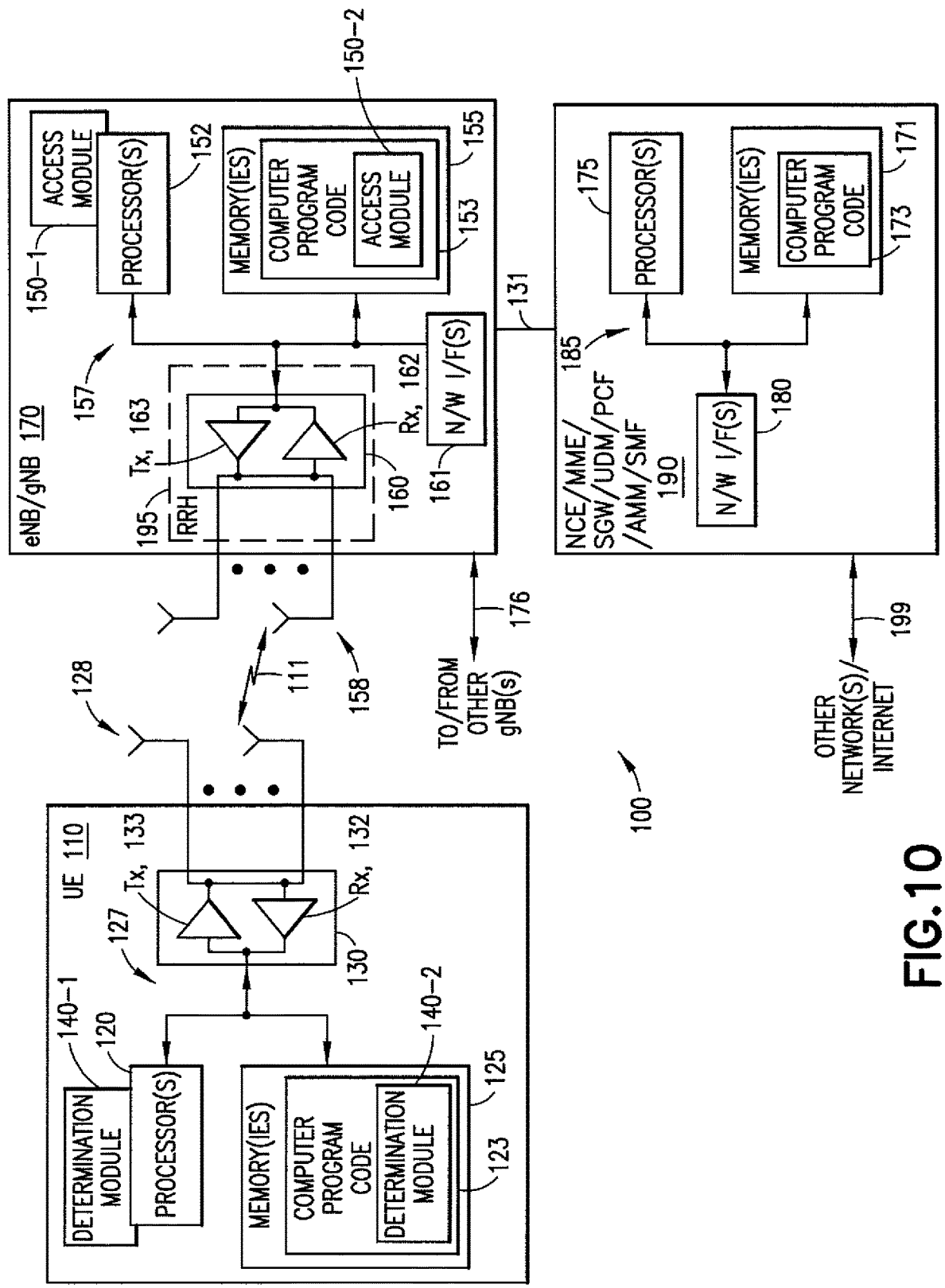
FIG. 10 shows a high level block diagram of various devices used in carrying out various aspects of the invention.

Before describing the example embodiments of the invention in further detail reference is made to FIG. 10. FIG. 10 shows a block diagram of one possible and non-limiting exemplary system in which the exemplary embodiments may be practiced.

As shown in FIG. 10, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a Determination module 140 which is configured to perform the example embodiments of the invention as described herein. The Determination module 150 may be implemented in hardware by itself of as part of the processors and/or the computer program code of the UE 110. The Determination module 140 comprising one of or both parts 140-1 and/or 140-2, which may be implemented in a number of ways. The Determination module 140 may be implemented in hardware as Determination module 140-1, such as being implemented as part of the one or more processors 120. The Determination module 140-1 may be implemented also as an integrated circuit or through other hardware such as a programmable gate array. In another example, the Determination module 140 may be implemented as Determination module 140-2, which is implemented as computer program code 123 and is executed by the one or more processors 120. Further, it is noted that the Determination modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a Determination module 150 which is configured to perform example embodiments of the invention as described herein. The Determination module 150 may comprise one of or both parts 150-1 and/or 150-2, which may be implemented in a number of ways. The Determination module 150 may be implemented in hardware by itself or as part of the processors and/or the computer program code of the gNB 170. Determination module 150-1, such as being implemented as part of the one or more processors 152. The Determination module 150-1 may be implemented also as an integrated circuit or through other hardware such as a programmable gate array. In another example, the Determination module 150 may be implemented as Determination module 150-2, which is implemented as computer program code 153 and is executed by the one or more processors 152. Further, it is noted that the Determination modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF 190. The link 131 may be implemented as, e.g., an S1 interface. The NCE/MME/SGW/UDM/PCF/AMM/SMF 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF 190 to perform one or more operations. In addition, the NCE/MME/SGW/UDM/PCF/AMM/SMF 190, as are the other devices, is equipped to perform operations of such as by controlling the UE 110 and/or gNB 170 for 5G and/or NR operations in addition to any other standards operations at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF 190 as in FIG. 10.

It is noted that functionality(ies), in accordance with example embodiments of the invention, of any devices as shown in FIG. 10 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 10 at least via the wireless link 111 and/or via the NCE/MME/SGW/UDM/PCF/AMM/SMF 190 using link 199 to Other Network(s)/Internet as in FIG. 10.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above the NBMP is a new standard under development and in accordance with example embodiments of the invention there is proposed new features including at least the Step Descriptor.

The Step descriptor does not have any current functionality to support spatial frame resolution method, only temporal segmentation is supported.

NBMP defines a special descriptor named "Step Descriptor". A resource with Step Descriptor shall include one metadata for each input for receiving the sequence number and/or start/duration of each input instance. Each input instance has a duration equal to "segment-duration". Such definition is used for temporal processing of segments by splitting single input into multiple parts with timestamping. The number of splitting is configurable and supports advanced processing modes like stateful or stateless s execution, with the help of buffering capabilities provided by queue tasks (see FIG. 4).

Figure 4:
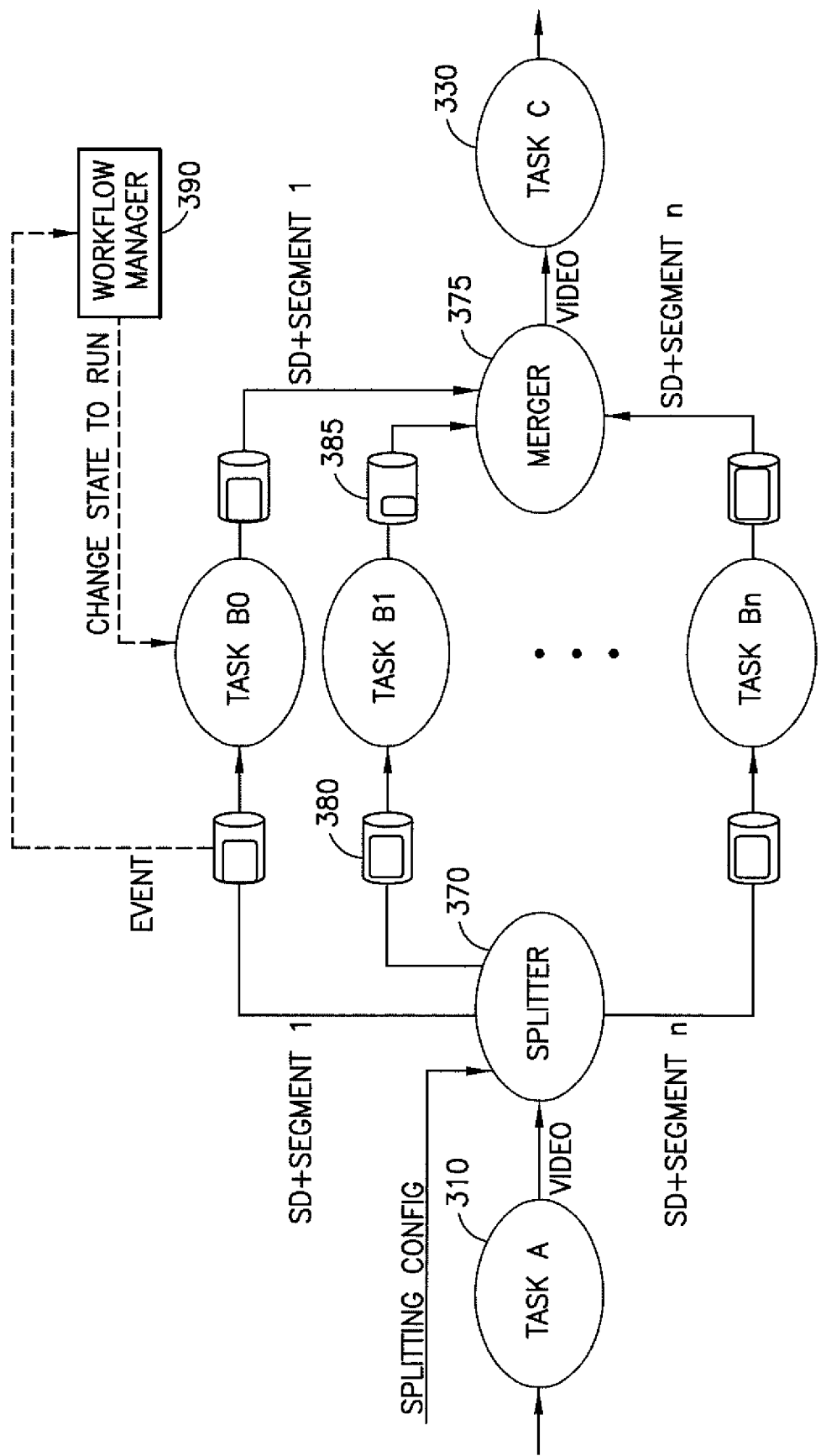
FIG. 4 shows an event-driven stepwise execution of NBMP tasks (workflow) with static stream partitioning in accordance with example embodiments of the invention.

FIG. 4 shows an event-driven stepwise execution of NBMP tasks (workflow) with static stream partitioning in accordance with example embodiments of the invention. As shown in FIG. 4 there is a video flow from tasks such as queued tasks from task A 310 to a splitter 370. Then as shown in FIG. 4 using input segment 380 the splitter 370 creates parallel NBMP processing flows for the video flow and these parallel NBMP processing flows produce output segment 385 which is sent to the merger 375 for merging and sending towards task C 330. As shown in FIG. 4 the Workflow Manager 390 is receiving events such as for capacity information and performing change state operations.

It is noted that in FIG. 4, task B0-Bn can be in an "idle" state or any other states except running state. The segments from Splitter are pushed to all queue tasks. Queues trigger events and inform Workflow manager 390 about the present capacities. Workflow manager 390 can change states of those tasks registered (Task B0 . . . Bn) accordingly to consume the segments stored in queues.

It is noted that in accordance with example embodiments of the invention any Tasks as defined herein can be at least one Task for NBMP transmission or receipt. Further, it is noted that any Task as described herein or in the Figures can include at least one Task that can be using data queued in a memory of a device and/or at least one Task using data as created for the NBMP processing as at least disclosed herein. These queues can hold multiple segments of media or other data.

Further, in accordance with example embodiments of the invention these Tasks can be associated with media data associated with a queue such as a FIFO (first-in-first-out) queues that can hold one or multiple segments. Those FIFO queues can issue events to Workflow Manager to indicate queue level states (full, half-full or empty), for example. Further, such state indications can be used to identify how and/or when to communicate the queued data for the NBMP processing as disclosed herein.

Each segment created by the Splitter contains a segment description (SD). The SD conveys the partition information together with the segment data down to the sub-workflows and finally reaches the Merger task where they are merged or re-composed back to its original form. The SD data can be passed through all sub-flows without any modification. The carriage of SD can be done with the segments, as the size is very small. For instance, the SD and segment data can be encapsulated into one payload passed through the processing pipe (sub-flows). The Merger can unpack the payload and get the SD carried by each segment.

In the case of temporal splitting, the SD includes the information like segment ID (global timestamp or monotonically increased time stamp) and segment duration (microsecond). In the case of frame splitting, the SD includes same information like segment ID (timestamp), regular/irregular grid definition(s) and grid identifier. Note that the Segment ID (for temporal splitting) must be a monotonically increased timestamp. In case of frame splitting (or spatial/volumetric splitting) the segment ID (e.g., a timestamp) and the grid ID, together should be unique. This can be because there can be multiple grid tasks for a given temporal segment, such as with the same time stamp. So the merger needs to take this into account.

Figure 5:
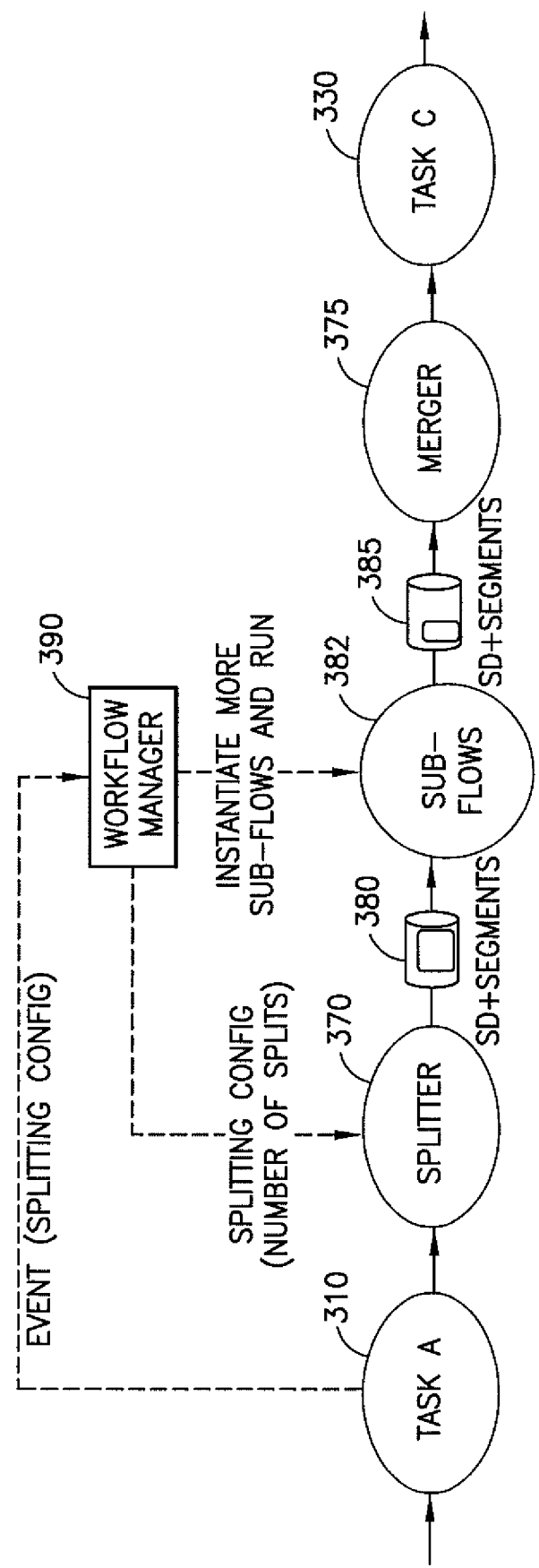
FIG. 5 shows dynamic splitting by previous NBMP task instance in accordance with example embodiments of the invention.

In another example embodiment in accordance with the invention (e.g., FIG. 5), the splitting strategy is dynamic, for example, one output of another task in the workflow. FIG. 5 shows dynamic splitting by previous NBMP task instance in accordance with example embodiments of the invention.

As shown in FIG. 5 there is a processing flow from tasks such as queued tasks from Task A 310 to Task C 330. Task A 310 supports generating events like splitting. The task A 310 can use, for example, NBMP Notification Descriptor, to notify the workflow manager 390 about the splitting event target to the splitter 370. The splitter 370 uses a splitting configuration (e.g., including number of splits), the configuration based on information from the workflow manager 390 receiving an indication of the event from Task A 310. The splitter 370 outputs SDs and input segments 380 to sub-flows 382 to output with one or multiple segment output 385 to a merger 375 for segment merging and then to a task C 330. In accordance with example embodiments of the invention the Workflow Manager 390 can instantly initiate more sub-flows and run. In accordance with example embodiments of the invention a number of the sub-flows can be signaled by the generated events from Task A 310.

At least the described operations herein can produce a special task that may produce the splitting strategies based on the content of the media data, for instance, video analysis task, semantic or object detection, etc. The splitting config may contain special spatial or volumetric partition information so that the Splitter can create SDs with different or irregular region definition later for the Merger to re-store the video frames, for example In accordance with example embodiments of the invention the temporal segmentation can use a one-dimensional segment and the spatial segmentation can use a two-dimensional segment.

In another embodiment (e.g., FIG. 6), the splitting strategy can be based on real-time run-time situations such as QoS (quality of service) from different resources, for example, metrics measured from or provided by cloud provider; or even from the client where NBMP Sink is located.

Figure 6:
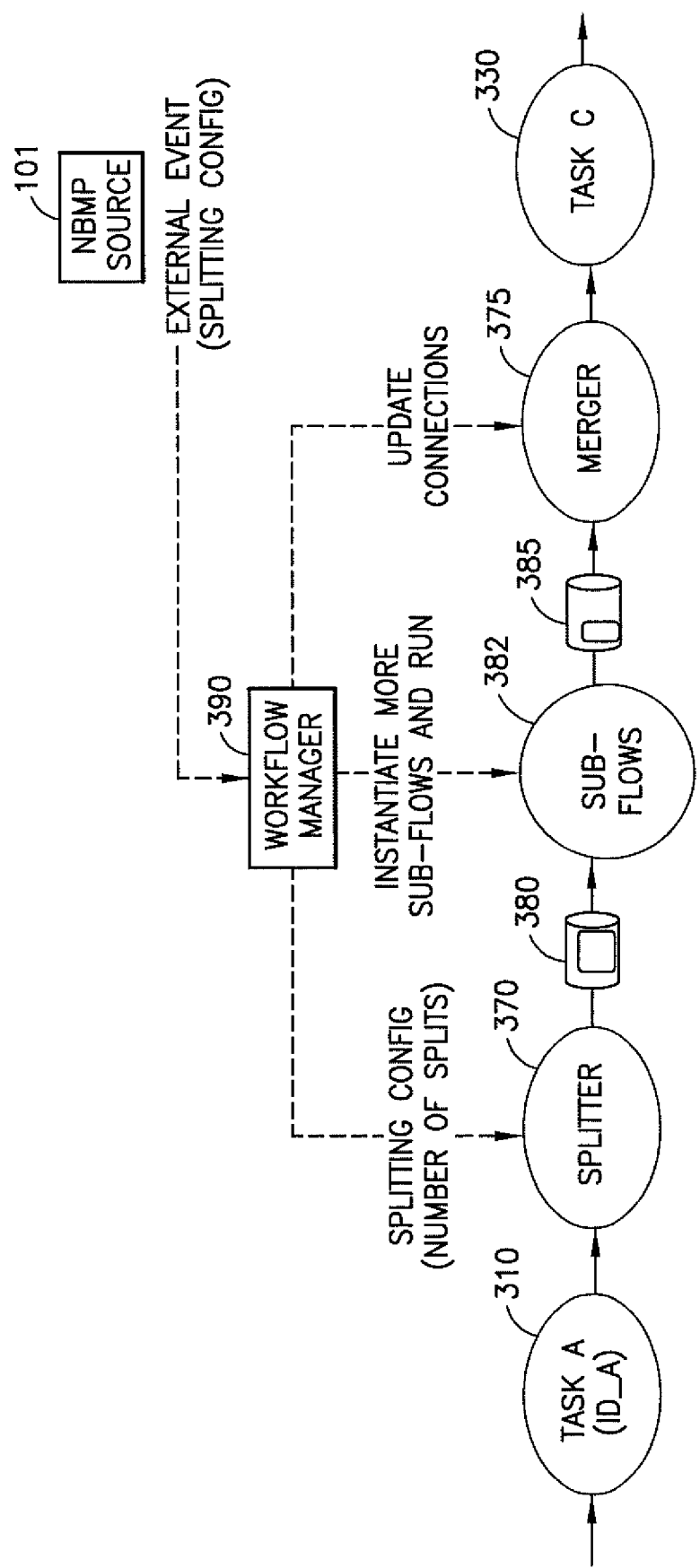
FIG. 6 shows dynamic splitting by external NBMP controller (e.g., NBMP source) in accordance with example embodiments of the invention.

FIG. 6 shows dynamic splitting by external NBMP controller (e.g., NBMP source 101) in accordance with example embodiments of the invention. As shown in FIG. 6 there is a processing flow from tasks such as queued tasks from task A 310 to task C 330. The splitter 370 uses a splitting configuration (e.g., including number of splits), the configuration based on information from the workflow manager 390 receiving an indication of the external event and splitting configuration information and which is updating connection information. The splitter 370 outputs SDs and segments 380 to sub-flows 382 created by Workflow Manager 390 to output with segment output 385 to a merger 375 and then to a task C 330. In accordance with example embodiments of the invention the Workflow Manager 390 can instantly initiate more sub-flows and run. The number of sub-flows can be signaled by the event sent from NBMP Source 101.

FIG. 7 shows an improved NBMP segment descriptor table in accordance with example embodiments of the invention. As shown in FIG. 7 there is in accordance with example embodiments of the invention an improved step descriptor for an NBMP standard. As shown in FIG. 7 there are temporal, spatial, or volumetric operations based on a step mode and segment identification. As shown in FIG. 7 these temporal, spatial, and volumetric operations include step-mode, temporal, spatial, and volumetric operations. Further, in FIG. 7 there is shown for each of these operations a name, definition, unit, type, and a valid range.

FIG. 7.1 shows another version of FIG. 7, where spatial and volumetric segmentation is represented as a more generic multi-dimensional design. The "number-of-dimension" (710) defines the number of dimensions of a segment other than temporal (e.g. 2-D). The default value is 0. The "high-dimension-segment-divisors" (720) is the array defining the divisors of the segment in the higher dimensions. Each element is an unsigned non-zero integer. The unit of divisor in each dimension depends on the unit of media on that dimension. For instance, the unit for spatial dimensions is the pixel, and the unit for color components is the color component index. The array size is equal to "number-of-dimensions". The "higher-dimensions-descriptions" (730) is the description of each other dimension. The array size is equal to "number-of-dimensions". Each element can be a string. The following values are examples, such as:

"width" (width of the video frame) and "height" (height of the video frame), 'RGB': color components R, G, and B, where R, G and B components are defined by index 0, 1, and 2 respectively, 'depth': image (not a depth map) and depth-map*, where image and depth-map are defined by index 0, 1, and 2 respectively, 'YUV': color components Y, U, V where Y, U and V components are defined by index 0, 1, and 2 respectively, and/or 'V-PCC': V-PCC components patch, geometry, occupancy, and attribute, where patch, geometry, occupancy, and attribute are defined by index 0, 1, 2 and 3 respectively.

The "higher-dimensions-segment-order" (640) defines the split/merge order for segments of the same time instance. The array shows the order of different dimensions. The value is an array element is the dimension index starting from zero. A dimension located in the array's element n+1 is nested in the dimension located in the array element n. The array size is equal to "number-of-dimensions". The "higher-dimension-overlap" (650) defines the size of overlap at each dimension other than temporal. The array size is equal to "number-of-dimensions". Each element is an unsigned integer. When the given overlap value is greater than the size of the segment, the original data shall be used than the segment. The "high-dimension-operation-units" (660) defines the number of segments of the resource in each dimension for operating in a stateless fashion. The array size is equal to "number-of-dimensions". Each element is an unsigned non-zero integer. The default value is an array of 1s, for example.

Figure 8:
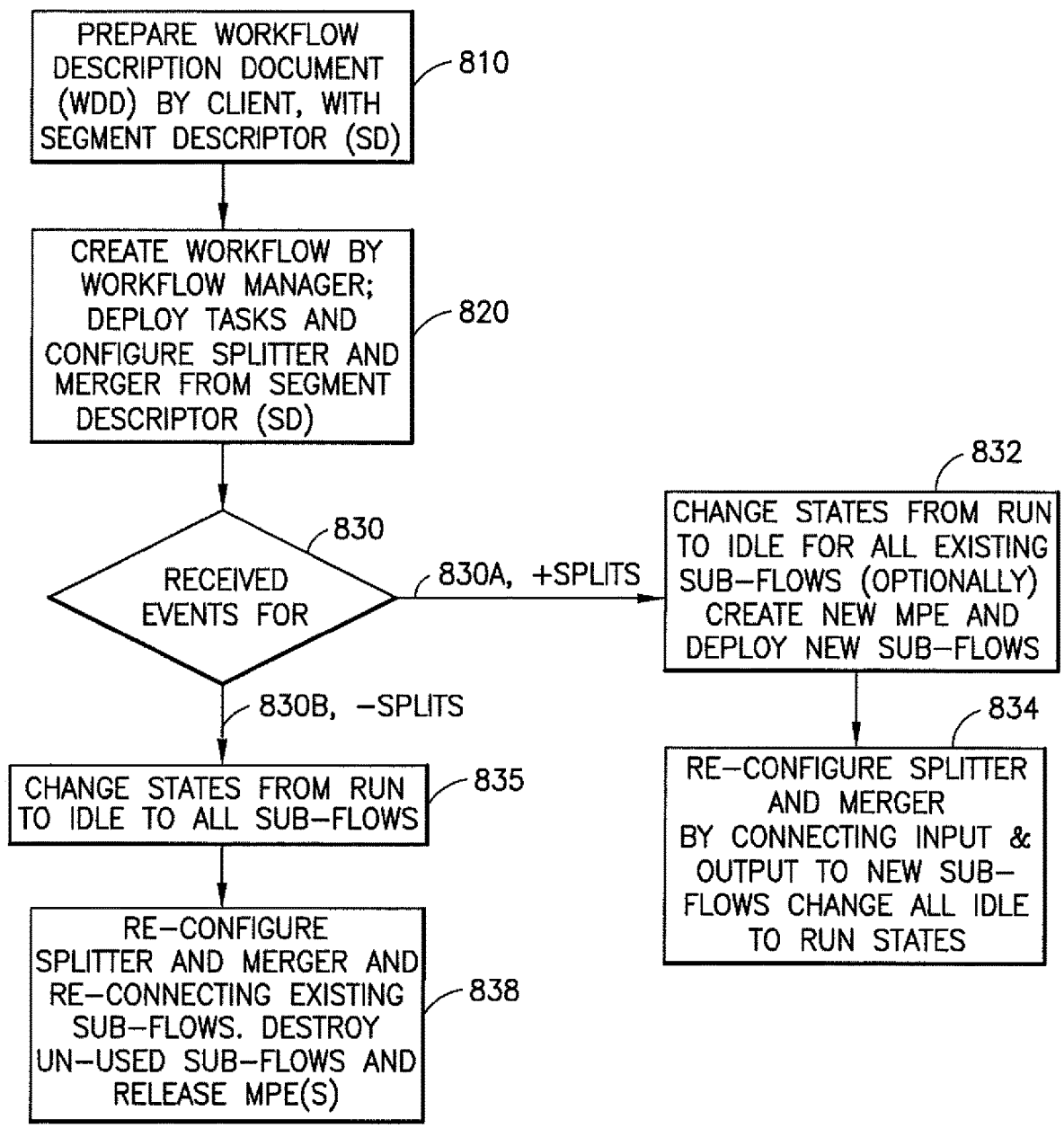
FIG. 8 shows a workflow for decreasing and/or increasing sub-flows with media processing entities in accordance with example embodiments of the invention.

For example, dividing a video frame into tiles for step processing can be achieved by the following configuration:
number-of-dimension=2;
higher-dimensions-description=[width, height];
high-dimension-segment-divisors=[16, 16] for tiles of 16×16 as the segment (tile) size;
higher-dimensions-segment-order=[0, 1] raster scan;
high-dimension-operation-units=[4, 4] for processing tiles of 256×256 at each step FIG. 8 shows a workflow for decreasing and/or increasing sub-flows with media processing entities in accordance with example embodiments of the invention. As shown in step 310 of FIG. 8 there is preparing workflow description document (WDD) by client, with segment descriptors. As shown in step 820 of FIG. 8 there is creating workflow by workflow manager; deploying tasks and configuring splitter and merger functions from a segment descriptor (SD). Then at step 830 of FIG. 8 there is shown that there is received events for. As shown in step 830A of FIG. 8, if splits are added as shown in step 832 of FIG. 8 there is changing states from Run to Idle for all existing sub-flows (optionally), and creating new MPE and deploying new sub-flows, and then as shown in step 834 re-configuring splitter and merger by connecting input and output to new sub-flows and changing all Idle states to Run states. Also as shown in step 830B if splits are not added as shown in step 836 there is changing states from Run to Idle for all sub-flows and as shown in step 838 re-configuring splitter and merger and reconnecting existing sub-flows, destroying un-used sub-flows and/or releasing MPE(s).

Figure 9:
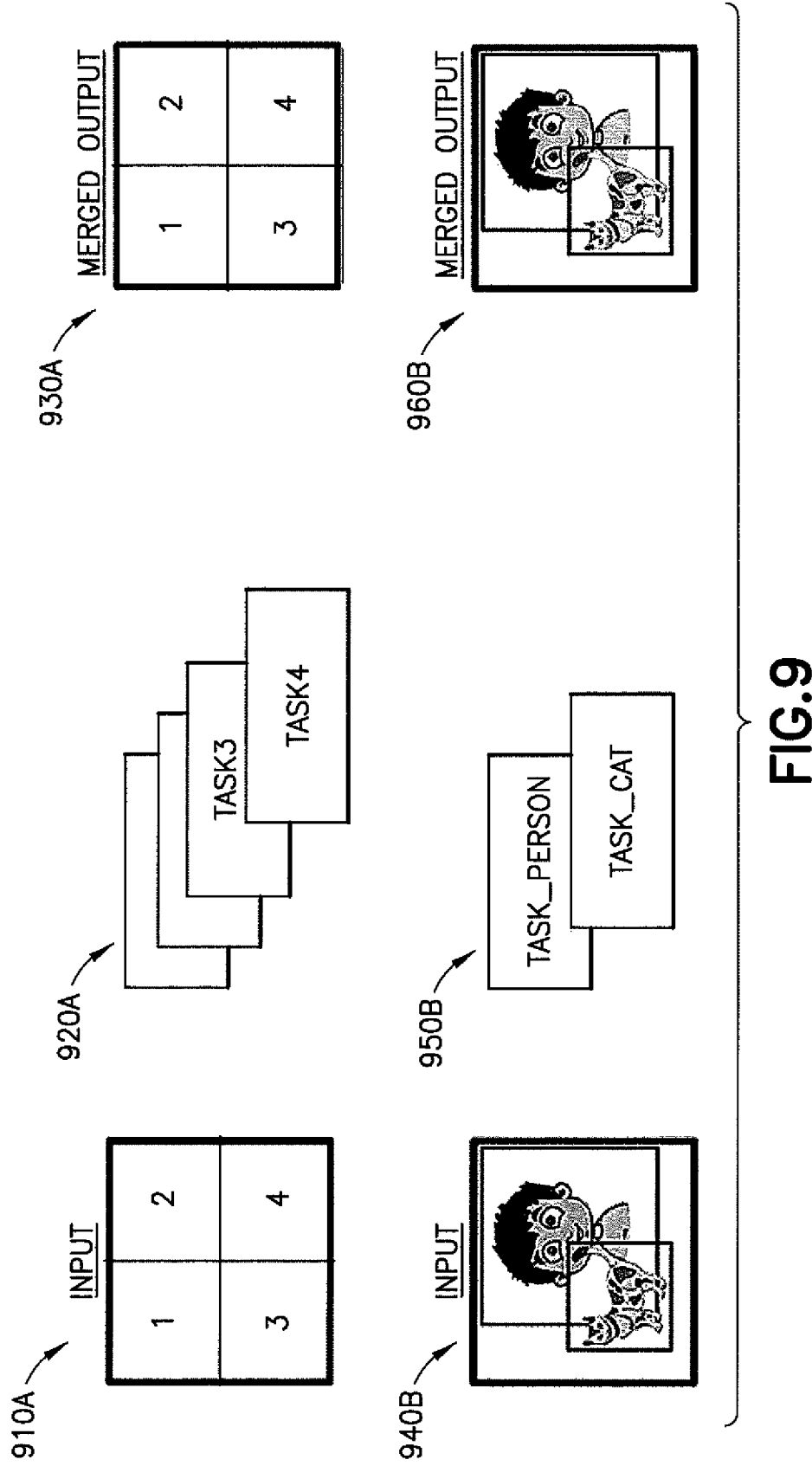
FIG. 9 shows regular vs irregular spatial separation values with region definitions and identifications.

FIG. 9 shows regular vs irregular spatial separation values with region definitions and identifications.

As shown in FIG. 9 there is several inputs 910A for a multimedia file 940B with a person and cat task 950B. It is noted that although in FIG. 9 there are shown four inputs and four tasks but there can be more or less inputs and/or tasks defined. The task_person and task_cat are broken up into Task1-Task4 of 920A in FIG. 9. As shown in 930A the Task1-Task4 are merged for outputting the multimedia file 960B.

FIG. 12 shows one volumetric segmentation by octree tree structure in accordance with example embodiments of the invention. Other segmentation techniques can be used to create sub-volumes of the original input data. In accordance with example embodiments of the invention the volumetric segmentation can use a higher-degree segmentation.

As shown in FIG. 12 each node in an octree 1200 subdivides as shown in 1201 the space it represents into eight octants 1210 as shown with 1211. In a point region (PR) octree, the node stores an explicit 3-dimensional point, which is the "center" of the subdivision for that node; the point defines one of the corners for each of the eight children 1220 as shown in 1221 and 1225. In such an MX octree, the subdivision point can be implicitly the center of the space the node represents. The root node of a PR octree can represent infinite space while the root node of an MX octree must represent a finite bounded space so that the implicit centers are well-defined. When used in this way, octrees are a special case of k-dimensional trees, in which the coordinate system can be three dimensional.

Figure 11:
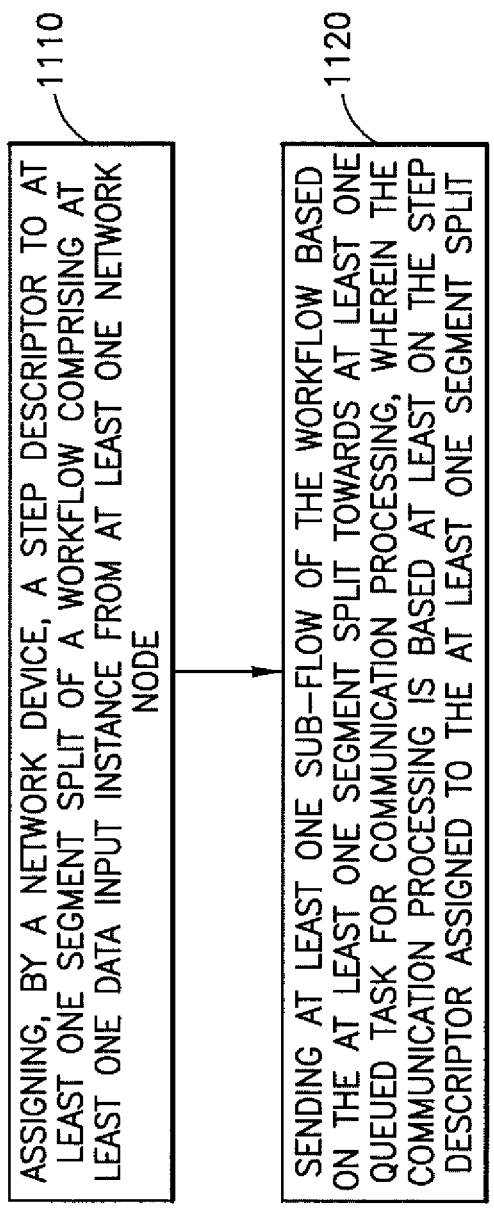
FIG. 11 shows a method which may be performed by an apparatus in accordance with example embodiments of the invention.

FIG. 11 illustrates operations which may be performed by a network device such as, but not limited to, a network node eNb/gNB 170 and/or a NCE/MME/SGW/UDM/PCF/AMM/SMF 190 as in FIG. 10. As shown in step 1110 of FIG. 11 there is assigning, by a network device, a step descriptor to at least one segment split of a workflow comprising at least one data input instance from at least one network node. Then as shown in step 1120 of FIG. 11 there is sending at least one sub-flow of the workflow based on the at least one segment split towards at least one queued task for communication processing, wherein the communication processing is based at least on the step descriptor assigned to the at least one segment split.

In accordance with the example embodiments as described in the paragraph above, wherein the assigning comprises the step descriptor is assigned to a payload of at least one segment split.

In accordance with the example embodiments as described in the paragraphs above, wherein the processing comprises determining, in response to the sending, information comprising capacities associated with the at least one queued task for the communication.

In accordance with the example embodiments as described in the paragraphs above, there is, based on the information, causing change of a state of the at least one queued task from an idle state to a running state for the communication processing.

In accordance with the example embodiments as described in the paragraphs above, wherein the at least one segment split is based on at least one of temporal segmentation or spatial segmentation.

In accordance with the example embodiments as described in the paragraphs above, wherein the temporal segmentation uses a one-dimensional segment and the spatial segmentation uses a two-dimensional segment.

In accordance with the example embodiments as described in the paragraphs above, wherein the at least one segment split of the work flow is using correlation operations based on at least one of spatial segmentation or volumetric segmentation, wherein the volumetric segmentation uses a three dimensional segment.

In accordance with the example embodiments as described in the paragraphs above, wherein the at least one segment split of the work flow is using correlation operations based on at least one of spatial or volumetric segmentation, or higher-degree segmentation, wherein the higher-degree segmentation uses segments determined by the number of dimensions and its divisor types.

In accordance with the example embodiments as described in the paragraphs above, wherein for a case the at least one segment strip is based on temporal segmentation, the step descriptor comprises at least one of a segment identification, a monotonically increased time stamp, or a segment duration.

In accordance with the example embodiments as described in the paragraphs above, wherein for a case the at least one segment strip is based on spatial segmentation, the step descriptor comprises at least one of segment identification, a timestamp, at least one of a regular or an irregular grid definition, or at least one of a regular or an irregular grid identifier.

In accordance with the example embodiments as described in the paragraphs above, wherein the at least one segment identification comprises a monotonically increased timestamp for temporal segmentation.

In accordance with the example embodiments as described in the paragraphs above, wherein the monotonically increased timestamp is identical for each segment associated with the at least one segment identification.

In accordance with the example embodiments as described in the paragraphs above, wherein the segment identification together with at least one of a regular or an irregular grid identifier are unique to enable at least one of reassembly or merger of the at least one segment split of a workflow.

In accordance with the example embodiments as described in the paragraphs above, wherein the communication processing comprises at least one of reassembly or merger of the at least one segment split of the workflow.

In accordance with the example embodiments as described in the paragraphs above, wherein the at least one of reassembly or merger comprises at least one of adjacent or overlapping reassembly or merger functionalities.

In accordance with the example embodiments as described in the paragraphs above, wherein the at least one of reassembly or merger takes into account grid tasks for at least one of a given temporal segment or a same timestamp value.

In accordance with the example embodiments as described in the paragraphs above, wherein the communication processing comprises at least one of stateful or stateless execution of the at least one segment split of the workflow at the at least one queued task.

In accordance with the example embodiments as described in the paragraphs above, wherein the at least one segment split is dynamic, comprising the at least one segment split is based on a content of media data of the workflow.

In accordance with the example embodiments as described in the paragraphs above, wherein the at least one segment split is based on a video analysis task associated with the content of media data of the workflow.

In accordance with the example embodiments as described in the paragraphs above, wherein the assigning the step descriptor comprises assigning step descriptors with a particular region definition for the communication processing, wherein for a case of two dimensional segmentation and the high dimension segment divisor is two and dimension description is the particular region width and height.

In accordance with the example embodiments as described in the paragraphs above, wherein the particular region definition comprises a different or irregular region definition for storing the at least one segment split of a workflow for later communication processing.

In accordance with the example embodiments as described in the paragraphs above, wherein assigning the step descriptor to at least one segment split of the workflow is based on an indication of at least one of a real-time run-time event.

In accordance with the example embodiments as described in the paragraphs above, wherein assigning the step descriptor to at least one segment split of the workflow is based on an indication of the real-time run-time event comprising a quality of service indication.

In accordance with the example embodiments as described in the paragraphs above, wherein the indication of the real-time run-time event is received from at least one of a cloud provider or a client where a Network-based Media Processing sink is located.

A non-transitory computer-readable medium (memory(ies) 155 and/or memory(ies) 171 as in FIG. 10) storing program code (computer program code 153 and/or access module 150-2 and/or computer program code 173 as in FIG. 10), the program code executed by at least one processor (processors 152 and/or access module 150-1 and/or processors 175 as in FIG. 10) to perform the operations as at least described in the paragraphs above.

In accordance with an example embodiment of the invention as described above there is an apparatus comprising: means for assigning (N/W I/F(s) 161 and/or N/W I/F(s) 180, memory(ies) 155 and/or memory(ies) 171 computer program code 153 and/or access module 150-2 and/or computer program code 173 and/or processors 152 and/or access module 150-1 and/or processors 175 as in FIG. 10), by a network device (eNB/gNB 170 and/or NCE/MME/SGW/UDM/PCF/AMM/SMF 190 as in FIG. 10), a step descriptor to at least one segment split of a workflow comprising at least one data input instance from at least one network node; and means for sending (N/W I/F(s) 161 and/or N/W I/F(s) 180, memory(ies) 155 and/or memory(ies) 171 computer program code 153 and/or access module 150-2 and/or computer program code 173 and/or processors 152 and/or access module 150-1 and/or processors 175 as in FIG. 10) at least one sub-flow of the workflow based on the at least one segment split towards at least one queued task for communication processing, wherein the communication processing is based at least on the step descriptor assigned to the at least one segment split.

In the example aspect of the invention according to the paragraph above, wherein at least the means for assigning and sending comprises a non-transitory computer readable medium [memory(ies) 155 and/or memory(ies) 171 as in FIG. 10] encoded with a computer program [computer program code 153 and/or access module 150-2 and/or computer program code 173 as in FIG. 10] executable by at least one processor [processors 152 and/or access module 150-1 and/or processors 175 as in FIG. 10].

Advantages of Example Embodiments of the Invention Include at Least that:
 The invention provides a method for improving the workflow parallelism (splitter and merger functionalities) to be more than mere temporal segmentation but also enable spatial segmentation;
 Spatial segmentation is important for visual content analysis, processing, synthesis and transcoding applications;
 The proposed mechanism enables the advanced functionality without the concomitant increase in the complexity for WDD creation. The workflow manager interprets the WDD to create the additional sub-flows required for spatial splitting strategy; and
 The combination of the proposed spatial-temporal splitting strategy covers a wide range of applications which need time varying processing. For example, the visual analysis can be coarse when a single object of interest is present in the scene versus multiple objects of interest are present at different times.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
 (a) hardware-only circuit implementations (such as implementations in only analog and/or digital circuitry);
 (b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
 (c) hardware circuit(s) and or processor(s), such as a microprocessor(s) or a portion of a microprocessor(s), that requires software (e.g., firmware) for operation, but the software may not be present when it is not needed for operation."

As used in this application, the term 'circuitry' refers to all of the following:
 (a) hardware-only circuit implementations (such as implementations in only analog and/or digital circuitry); and
 (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
 (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   assigning, by a network device, a step descriptor to at least one segment split of a workflow comprising at least one data input instance from at least one network node,
   wherein the step descriptor comprises a sequence number and is using one metadata for each input for receiving the sequence number and comprises a start and a segment duration of each of the at least one data input instance, and
   wherein for the at least one segment split comprising frame splitting, the step descriptor includes a same grid identifier timestamp and a same grid identification such that there can be multiple grid tasks for a same time stamp; and
   sending at least one sub-flow of the workflow based on the at least one segment split comprising the at least one data input instance towards at least one queued task for communication processing, wherein the communication processing is based at least on the step descriptor assigned to the at least one segment split.

2. The method according to claim 1, wherein the assigning comprises the step descriptor is assigned to a payload of at least one segment split passed through the at least one sub-flow, and wherein segment data of the workflow is encapsulated into the payload and passed through the at least one sub-flow without any modification.

3. The method according to claim 1, wherein the at least one segment split is based on at least one of temporal segmentation or spatial segmentation, wherein the temporal segmentation uses a one-dimensional segment and the spatial segmentation uses a two-dimensional segment.

4. The method according to claim 1, wherein the at least one segment split of the work flow is using correlation operations based on at least one of spatial segmentation or volumetric segmentation, wherein the volumetric segmentation uses a three-dimensional segment.

5. The method according to claim 1, wherein the at least one segment split of the work flow is using correlation operations based on at least one of spatial or volumetric segmentation, or higher-degree segmentation, wherein the higher-degree segmentation uses segments determined by the number of dimensions and its divisor types.

6. The method according to claim 1, wherein for a case the at least one segment strip is based on temporal segmentation, the step descriptor comprises at least one segment identification, a monotonically increased time stamp, and wherein the at least one segment identification comprises a monotonically increased timestamp for temporal segmentation.

7. The method according to claim 6, wherein the monotonically increased timestamp is identical for each segment associated with the at least one segment identification.

8. The method according to claim 1, wherein for a case the at least one segment strip is based on spatial segmentation, the step descriptor comprises at least one of segment identification, a timestamp, at least one of a regular or an irregular grid definition, or at least one of a regular or an irregular grid identifier.

9. The method according to claim 8, wherein the segment identification together with at least one of a regular or an irregular grid identifier are unique to enable at least one of reassembly or merger of the at least one segment split of a workflow.

10. The method according to claim 9, wherein the at least one of reassembly or merger takes into account grid tasks for at least one of a given temporal segment or a same timestamp value.

11. The method according to claim 1, wherein the communication processing comprises at least one of reassembly or merger of the at least one segment split of the workflow.

12. The method according to claim 1, wherein the communication processing comprises at least one of stateful or stateless execution of the at least one segment split of the workflow at the at least one queued task.

13. The method according to claim 1, wherein the at least one segment split is dynamic, comprising the at least one segment split is based on a content of media data of the workflow.

14. The method according to claim 13, wherein the at least one segment split is based on a video analysis task associated with the content of media data of the workflow.

15. The method according to claim 14, wherein the assigning the step descriptor comprises assigning step descriptors with a particular region definition for the communication processing, wherein for a case of two dimensional segmentation and a high dimension segment divisor is two and dimension description is the particular region width and height.

16. The method according to claim 15, wherein the particular region definition comprises a different or irregular region definition for storing the at least one segment split of a workflow for later communication processing.

17. An apparatus comprising:
   at least one processor; and
   at least one non-transitory memory including computer program code, where the at least one non-transitory memory and the computer program code are configured, with the at least one processor, to cause the apparatus to at least:

assign, by a network device, a step descriptor to at least one segment split of a workflow comprising at least one data input instance from at least one network node, wherein the step descriptor comprises a sequence number and is using one metadata for each input for receiving the sequence number and at least one of comprises a start or and a segment duration of each of the at least one data input instance, and wherein for the at least one segment split comprising frame splitting, the step descriptor includes a same grid identifier timestamp and a same grid identification such that there can be multiple grid tasks for a same time stamp; and send at least one sub-flow of the workflow based on the at least one segment split comprising the at least one data input instance towards at least one queued task for communication processing, wherein the communication processing is based at least on the step descriptor assigned to the at least one segment split.

18. The apparatus according to claim 17, wherein the assigning comprises the step descriptor is assigned to a payload of at least one segment split passed through the at least one sub-flow, and wherein segment data of the workflow is encapsulated into the payload and passed through the at least one sub-flow without any modification.

19. The apparatus according to claim 17, wherein the at least one segment split is based on at least one of temporal segmentation or spatial segmentation, wherein the temporal segmentation uses a one-dimensional segment and the spatial segmentation uses a two-dimensional segment.

20. The apparatus according to claim 17, wherein the at least one segment split of the work flow is using correlation operations based on at least one of spatial segmentation or volumetric segmentation, wherein the volumetric segmentation uses a three dimensional segment.

21. The apparatus according to claim 17, wherein the at least one segment split of the work flow is using correlation operations based on at least one of spatial or volumetric segmentation, or higher-degree segmentation, wherein the higher-degree segmentation uses segments determined by the number of dimensions and its divisor types.

22. The apparatus according to claim 17, wherein for a case the at least one segment strip is based on temporal segmentation, the step descriptor comprises at least one segment identification, a global timestamp, and wherein the at least one segment identification comprises a monotonically increased timestamp for temporal segmentation.

23. The apparatus according to claim 22, wherein the monotonically increased timestamp is identical for each segment associated with the at least one segment identification.

24. The apparatus according to claim 17, wherein for a case the at least one segment strip is based on spatial segmentation, the step descriptor comprises at least one of segment identification, a timestamp, at least one of a regular or an irregular grid definition, or at least one of a regular or an irregular grid identifier.

25. The apparatus according to claim 24, wherein the segment identification together with at least one of a regular or an irregular grid identifier are unique to enable at least one of reassembly or merger of the at least one segment split of a workflow.

26. The apparatus according to claim 25, wherein the at least one of reassembly or merger takes into account grid tasks for at least one of a given temporal segment or a same timestamp value.

27. The apparatus according to claim 24, wherein the communication processing comprises at least one of reassembly or merger of the at least one segment split of the workflow.

28. The apparatus according to claim 17, wherein the communication processing comprises at least one of stateful or stateless execution of the at least one segment split of the workflow at the at least one queued task.

29. The apparatus according to claim 28, wherein the at least one segment split is based on a video analysis task associated with the content of media data of the workflow.

30. The apparatus according to claim 17, wherein the at least one segment split is dynamic, comprising the at least one segment split is based on a content of media data of the workflow.

31. The apparatus according to claim 17, wherein the assigning the step descriptor comprises assigning step descriptors with a particular region definition for the communication processing, wherein for a case of two dimensional segmentation and a high dimension segment divisor is two and dimension description is the particular region width and height.

32. The apparatus according to claim 31, wherein the particular region definition comprises a different or irregular region definition for storing the at least one segment split of a workflow for later communication processing.

* * * * *